US010766560B2

(12) United States Patent
Cai (10) Patent No.: US 10,766,560 B2
(45) Date of Patent: Sep. 8, 2020

(54) FOLDING FRAME AND FOLDING VEHICLE

(71) Applicant: SHENZHEN BSTCAR TECHNOLOGY CO., LTD., Shenzhen, Guangdong (CN)

(72) Inventor: Jianjun Cai, Guangdong (CN)

(73) Assignee: SHENZHEN BSTCAR TECHNOLOGY CO., LTD., Shenzhen (CN)

(*) Notice: Subject to any disclaimer, the term of this patent is extended or adjusted under 35 U.S.C. 154(b) by 288 days.

(21) Appl. No.: 15/761,246

(22) PCT Filed: Nov. 3, 2016

(86) PCT No.: PCT/CN2016/104434
§ 371 (c)(1),
(2) Date: Mar. 19, 2018

(87) PCT Pub. No.: WO2018/081968
PCT Pub. Date: May 11, 2018

(65) Prior Publication Data
US 2020/0239100 A1    Jul. 30, 2020

(51) Int. Cl.
*B62K 3/02* (2006.01)
*B62K 15/00* (2006.01)
*B62K 25/00* (2006.01)

(52) U.S. Cl.
CPC .............. *B62K 15/008* (2013.01); *B62K 3/02* (2013.01); *B62K 25/005* (2013.01);
(Continued)

(58) Field of Classification Search
CPC ...... B62K 15/008; B62K 3/02; B62K 25/005; B62K 2015/001; B62K 2015/003; B62K 2015/005
See application file for complete search history.

(56) References Cited

U.S. PATENT DOCUMENTS 5,330,219 A * 7/1994 Groendal ................. B62K 3/04
                                                                280/275
5,794,958 A * 8/1998 Hsiao .................... B62K 15/006
                                                                280/278
(Continued)

FOREIGN PATENT DOCUMENTS

CN        2558573 Y        7/2003
CN        101032990        9/2007
(Continued)

OTHER PUBLICATIONS

International search report dated Aug. 7, 2017 from corresponding application No. PCT/CN2016/104434.

*Primary Examiner* — Jacob D Knutson
*Assistant Examiner* — Marlon A Arce
(74) *Attorney, Agent, or Firm* — Hauptman Ham, LLP (57) ABSTRACT

A folding frame and a folding vehicle are provided. The folding frame includes a cross beam, a pillar, and a supporting column; the cross beam includes a front beam and a rear beam. A rear-end bottom of the front beam is rotationally connected to a front-end bottom of the rear beam so that the two can be vertically folded. An angle between a rotational axis of the front beam and a central axis of the rear beam is an acute angle. The supporting column includes a front column and a rear column, the front column is inserted in the front beam to cooperate, the front column is rotationally connected to the rear column, and the rear column is rotationally connected to the pillar. The front beam and the rear beam are vertically folded, and then they will not spontaneously rotate to fold in the riding process, possessing relatively good reliability.

20 Claims, 11 Drawing Sheets

(52) U.S. Cl.
CPC .. *B62K 2015/001* (2013.01); *B62K 2015/003* (2013.01); *B62K 2015/005* (2013.01)

(56) References Cited

U.S. PATENT DOCUMENTS

| | | | | |
|---|---|---|---|---|
| 6,032,971 | A * | 3/2000 | Herder | B62K 15/008 |
| | | | | 280/278 |
| 7,198,281 | B2 | 4/2007 | Huang | |
| 8,919,798 | B2 * | 12/2014 | Hon | B62K 15/00 |
| | | | | 280/278 |
| 2008/0224441 | A1 * | 9/2008 | Lu | B62K 15/006 |
| | | | | 280/278 |
| 2013/0228996 | A1 * | 9/2013 | Hon | B62K 15/008 |
| | | | | 280/287 |
| 2014/0319800 | A1 * | 10/2014 | Garrido | B62K 15/006 |
| | | | | 280/287 |
| 2017/0190378 | A1 * | 7/2017 | Treadway | B62K 15/008 |
| 2017/0210439 | A1 * | 7/2017 | Schwaiger | B62K 19/18 |
| 2019/0031270 | A1 * | 1/2019 | Thompson | B62K 13/08 |

FOREIGN PATENT DOCUMENTS

| | | |
|---|---|---|
| CN | 200942839 Y | 9/2007 |
| CN | 201092369 | 7/2008 |
| CN | 202863669 U | 4/2013 |
| CN | 103129688 | 6/2013 |
| CN | 204979057 | 1/2016 |
| CN | 105539685 A | 5/2016 |
| CN | 205292938 | 6/2016 |
| JP | 2006-335143 A | 12/2006 |
| JP | 2014-524376 A | 9/2014 |
| KR | 20140053201 A | 5/2014 |
| TW | 200600399 A | 1/2006 |
| TW | I285171 | 8/2007 |

* cited by examiner

FOLDING FRAME AND FOLDING VEHICLE

RELATED APPLICATIONS

The present application is a National Phase of International Application Number PCT/CN2016/104434, filed Nov. 3, 2016.

TECHNICAL FIELD

The present disclosure relates to the field of transportation means, and particularly to a folding frame and a folding vehicle.

BACKGROUND

For folding frames in the prior art, the frame is usually horizontally rotated to fold, so that front and rear wheels are folded from left and right, thus reducing the space occupied. This folding manner requires fixation after the frame is unfolded so as to prevent sideway shaking in a riding process. Since vibration will occur in the riding process, a fixed structure is easy to loosen, so as to bring about safety risks. Moreover, the operation of the fixed structure is relatively complex, and is not beneficial to use. Furthermore, this folding structure lacks effective support in an unfolded state, and the stability thereof is relatively poor.

SUMMARY

A technical problem to be solved by the present disclosure is to provide a folding frame and a folding vehicle, with reliable stability and simple and convenient operation as well.

In order to solve the above technical problem, in one aspect, an embodiment of the present disclosure provides a folding frame, including a cross beam, a pillar, and a supporting column, wherein the cross beam includes a front beam and a rear beam. A rear-end bottom of the front beam is rotationally connected to a front-end bottom of the rear beam so that the two can be vertically folded. Moreover, an angle between a rotational axis of the front beam and a central axis of the rear beam is an acute angle. The supporting column includes a front column and a rear column, the front column is inserted in the front beam to cooperate, a rear end of the front column and the front end of the rear column are rotationally connected so that the two can be folded, and the rear column and the pillar are rotationally connected.

When the folding frame is in an unfolded state, the rear end of the front beam abuts against the front end of the rear beam, the front end of the front column is inserted in the front beam, and supports below the front beam, the cross beam, the pillar, and the supporting column define a triangular shape;

When the folding frame is in a folded state, the front column is rotated relative to the rear column to a state in which it is separated from the front beam, and the front beam is rotated relative to the rear beam to the side of the pillar.

In the above, the front beam and the rear beam are connected through a folding mechanism, the folding mechanism includes two hinges, the two hinges are rotationally connected, and the two hinges are respectively fixed onto a rear-end face of the front beam and a front-end face of the rear beam, in the folded state of the folding frame, a plane where the hinge is located is perpendicular to the central axis of the rear beam; an angle between a rotation shaft between the two hinges and the plane where the hinge is located is an acute angle, and the rotation shaft between the two hinges forms a rotation shaft between the front beam and the rear beam.

In the above, the front column and the front beam are inserted together through an insertion mechanism, the insertion mechanism includes an insertion column and an insertion groove, the insertion column is provided with a frustum-shaped structure on a top end, one end of the frustum-shaped structure with a relatively big diameter is fixedly connected to the insertion column, and at a place where the frustum-shaped structure is connected to the insertion column, the frustum-shaped structure has a bigger diameter than the insertion column.

The bottom end of the insertion column is fixedly connected to the front end of the front column, and the insertion groove is arranged on the front beam.

Alternatively, the bottom end of the insertion column is fixedly connected to the front beam, and the insertion groove is arranged on the front end of the front column.

In the above, in a case where the insertion groove is arranged on the front beam, the front beam is arranged with a positioning column thereon, the insertion groove is arranged on the positioning column. When the folding frame is in the unfolded state, the positioning column, the insertion column, and the front column are located on the same axis.

In the above, a positioning mechanism capable of positioning the front column and the rear column on a same axis is provided between the front column and the rear column.

In the above, the front column and the rear column are rotationally connected therebetween through a rotation mechanism. The rotation mechanism includes a first rotating element and a second rotating element in rotational connection. The positioning mechanism includes a positioning protrusion and a positioning recess cooperating with each other. The positioning protrusion is provided on the first rotating element, the positioning recess is provided on the second rotating element. When the folding frame is in an unfolded state, the positioning protrusion is positioned in the positioning recess, and when the folding frame is in the folded state, the positioning protrusion is moved to the outside of the positioning recess.

The first rotating element is fixed onto the rear column; correspondingly, the second rotating element is fixed onto the front column.

Alternatively, the first rotating element is fixed onto the front column, and correspondingly, the second rotating element is fixed onto the rear column.

In the above, the second rotating element is in a U shape, and the first rotating element is rotationally connected between two supporting arms of the second rotating elements. The positioning recess is provided a place where two supporting arms of the second rotating elements are connected. The positioning protrusion is provided on an end face of the first rotating element facing the second rotating element.

In the above, the rotation mechanism is further provided thereon with a one-way limit structure for enabling the supporting column to be bent unidirectionally, in other words, to be bend one-way only.

In the above, the first rotating element includes a base and a connecting arm, which connecting arm is fixed in a middle position of the base. The connecting arm is rotationally connected between two supporting arms of the second rotating element. The base is fixedly connected to the rear column or the front column.

A limit protrusion is provided on a surface of the base facing the second rotating element, and the limit protrusion is located below the second rotating element, the limit protrusion forms the one-way limit structure.

In the above, a rotation shaft between the pillar and the rear column is parallel to a rotation shaft between the front column and the rear column.

In the above, the rotation shaft between the front column and the rear column is simultaneously perpendicular to a central axis of the rear beam and the central axis of the pillar.

In the above, a connecting element is fixed on the pillar, two clamping elements are provided on the connecting element, and the rear column is rotationally connected between the two clamping elements. The folding frame further includes a rear wheel bracket, which rear wheel bracket includes two cross bars. The two cross bars are respectively fixed on two sides of the pillar, and are both fixedly connected to the connecting element.

In the other aspect, the present disclosure provides a folding vehicle, including the folding frame mentioned above.

For the folding frame and the folding vehicle provided in the present disclosure, the front beam and the rear beam are vertically folded, and then they will not spontaneously rotate to fold in the riding process, possessing relatively good reliability. The front end of the front column is inserted in the front beam, supports below the front beam, and with the supporting effect of the supporting column on the front beam, the cross beam can be positioned in the unfolded state and will not be flipped downwards. The cross beam, the pillar, and the supporting column define a triangular shape, which can ensure the stability of the whole frame. When the rear column and the front column are rotated, the front column and the rear column can be bent relatively, the front column can be pulled out from the front beam, and the front beam is flipped downwards, then the frame can be folded, being simple in operation and convenient in use.

BRIEF DESCRIPTION OF THE DRAWINGS

In order to illustrate the technical solutions of embodiments of the present disclosure or the prior art more clearly, the accompanying drawings which need to be used in the description of the embodiments or the prior art will be briefly described. Apparently, the accompanying drawings described in the following are merely for some embodiments of the present disclosure, and a person ordinarily skilled in the art still can obtain other accompanying drawings according to these accompanying drawings without any creative effort.

DETAILED DESCRIPTION OF ILLUSTRATED EMBODIMENTS

Below technical solutions of embodiments of the present disclosure will be described clearly and completely in conjunction with figures of the embodiments of the present disclosure. All of orientations such as "front", "rear", "left", "right", "upper", "lower" described in the following embodiments refer to orientations of a folding vehicle in normal use with respect to a user.

An embodiment of the present disclosure provides a folding vehicle. The folding vehicle can be a folding bicycle, and also can be a folding electric vehicle. The folding vehicle includes a folding frame 100, a front wheel, and a rear wheel (not shown in the figures). The front wheel is mounted to a front end of the folding frame 100. The rear wheel is mounted to a rear end of the folding frame 100. With the folding frame 100, the front wheel can be flipped downwards and offset to one side of the folding vehicle, so that the front wheel is moved to a position where it substantially overlaps the rear wheel, so as to save the space and facilitate storage.

Referring to FIG. 1 to FIG. 4, a folding frame 100 provided in an embodiment of the present disclosure includes a cross beam 1, a pillar 2, and a supporting column 3. The cross beam 1 includes a front beam 11 and a rear beam 12. A rear-end bottom of the front beam 11 is rotationally connected to a front-end bottom of the rear beam 12 so that the two can be vertically folded. An angle between a rotational axis of the front beam 11 and a central axis of the rear beam 12 is an acute angle. Since the rotational axis between the front beam 11 and the rear beam 12 is not perpendicular to or parallel to the central axis of the rear beam 12, but defines an acute angle therewith, after the front beam 11 is rotated relative to the rear beam 12, the central axes of the front beam 11 and the rear beam 12 are straight lines on different planes, as shown in FIG. 8 to FIG. 13, the front beam 11 can be flipped downwards and offset towards the side of the rear beam 12, so that the front wheel and the rear wheel are overlapped, realizing the folding of the entire vehicle. Since the front beam 11 and the rear beam 12 are vertically folded, they will not spontaneously rotate to fold in the riding process, possessing relatively good reliability.

As shown in FIG. 3 to FIG. 7, the supporting column 3 includes a front column 31 and a rear column 32. The front column 31 is inserted in the front beam 11 to cooperate. The front column 31, after being inserted in the front beam 11, can provide support to the front beam 11. A rear end of the front column 31 is rotationally connected to a front end of the rear column 32 so that the two can be folded. The rear column 32 is rotationally connected to the pillar 2. The front column 31 is rotationally connected to the rear column 32. By means of the rotation of the front column 31 and the rear column 32, the front column 31 can be conveniently inserted in the front beam 11, or pulled out from the front beam 11.

As shown in FIG. 1 to FIG. 4, when the folding frame 100 is in an unfolded state, the rear end of the front beam 11 abuts against the front end of the rear beam 12, so that the front beam 11 is flipped upwards until the front beam 11 and the rear beam 12 are located on the same axis, then the front beam 11 will not be rotated further upwards. The front end of the front column 31 is inserted in the front beam 11, and supports below the front beam 11. The front column 31 and the rear column 32 are located on the same axis. With the supporting effect of the supporting column 3 on the front beam 11, the cross beam 1 can be positioned in the unfolded state and will not be flipped downwards. The three, the cross beam 1, the pillar 2, and the supporting column 3 as a whole define a triangular shape. The three form a stable triangle, and can ensure the stability of the entire frame.

As shown in FIG. 8 to FIG. 13, when the folding frame 100 is in the folded state, the front column 31 is rotated relative to the rear column 32 to a state in which it is separated from the front beam 11, and the front beam 11 is rotated relative to the rear beam 12 to the side of the pillar 2. When the folding frame 100 is folded, the rear column 32 and the front column 31 are rotated, so that the front column 31 and the rear column 32 are both bent relatively, and the front column 31 can be pulled out from the front beam 11, and the front column 31 just can be separated from the front beam 11. After a supporting force of the supporting column 3 to the cross beam 1 is removed, the front beam 11 can be rotated relative to the rear beam 12. The front beam 11 is flipped downwards, and since the rotational axis of the front beam 11 defines an acute angle with an axial direction of the rear beam 12, the front beam 11, when being flipped downwards, is offset to one side of the frame, so that the front beam 11 is flipped to the side of the pillar 2. The front beam 11 can drive the front wheel to flip, so that the front wheel and the rear wheel are substantially overlapped, thus reducing the dimension of the entire folding vehicle, facilitating storage or carry-over, being simple in operation, and convenient in use.

Figure 8:
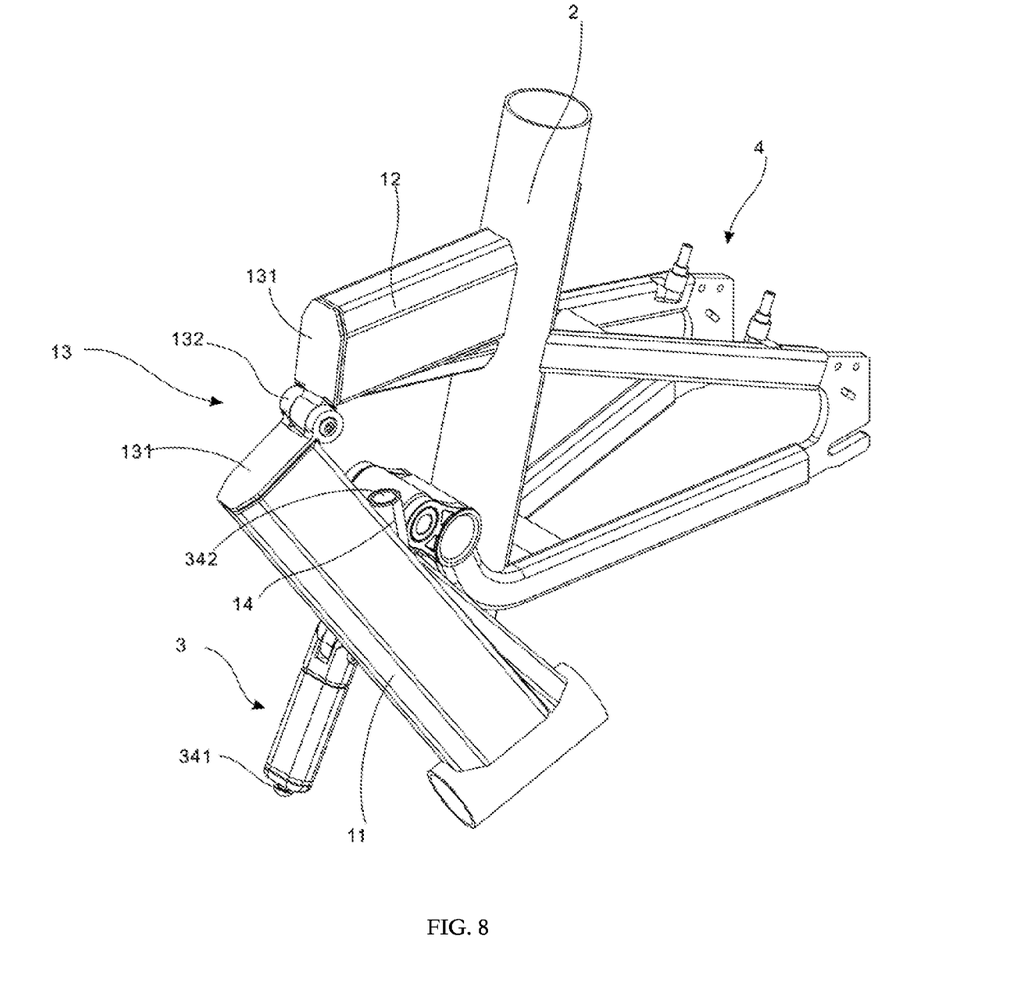
FIG. 8 is a structural schematic diagram of a folding frame provided in the present disclosure in a folded state.
Figure 9:
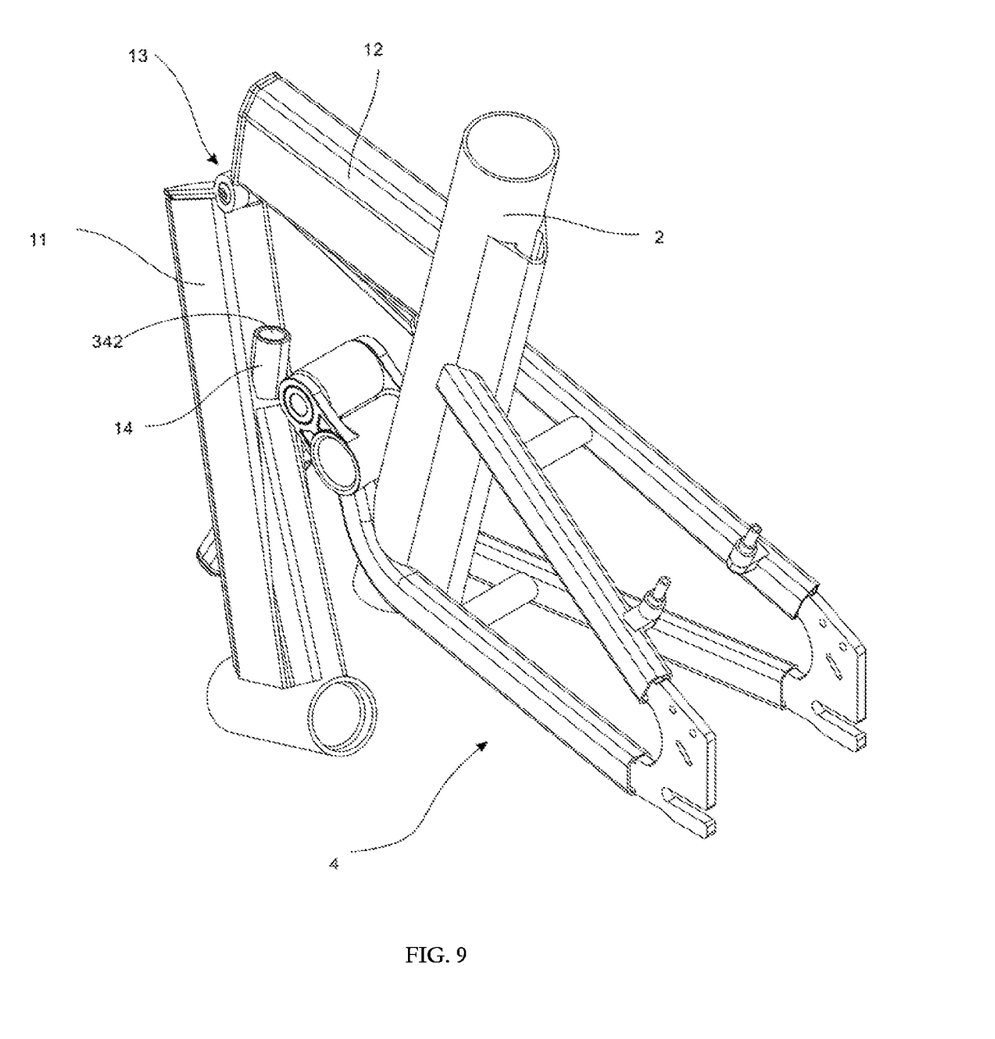
FIG. 9 is a structural schematic diagram of the folding frame of FIG. 8 in the folded state from another angle.
Figure 10:
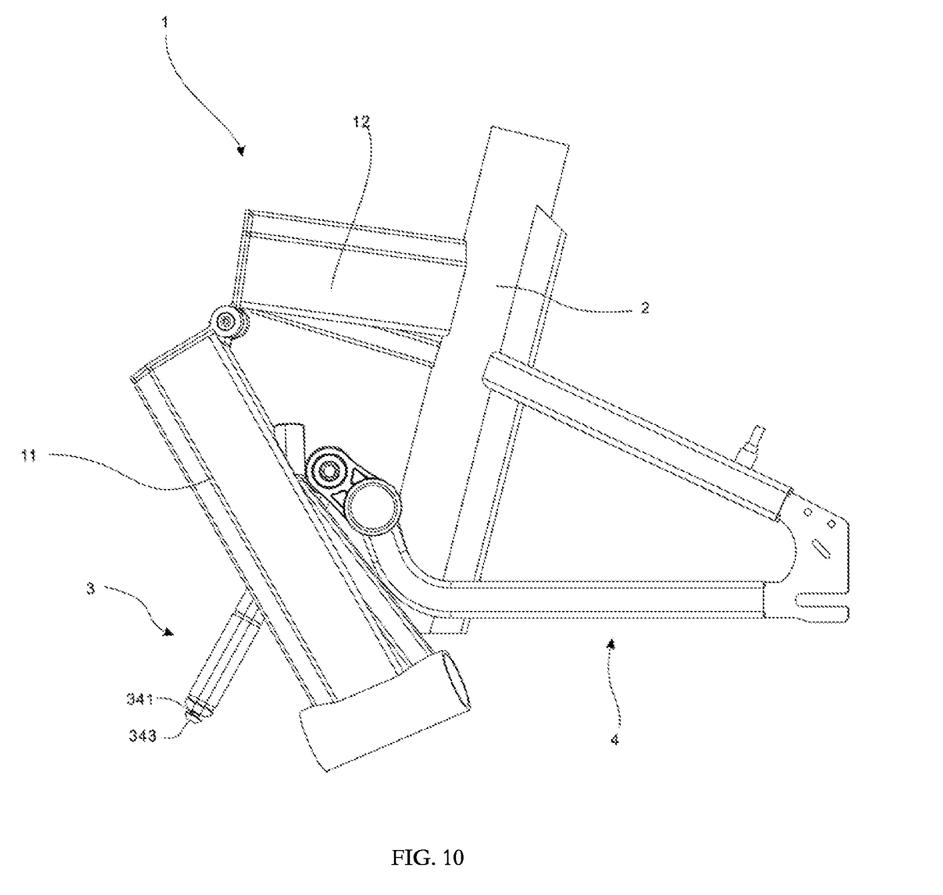
FIG. 10 is a structural schematic diagram of the folding frame of FIG. 8 in the unfolded state from a further angle.
Figure 11:
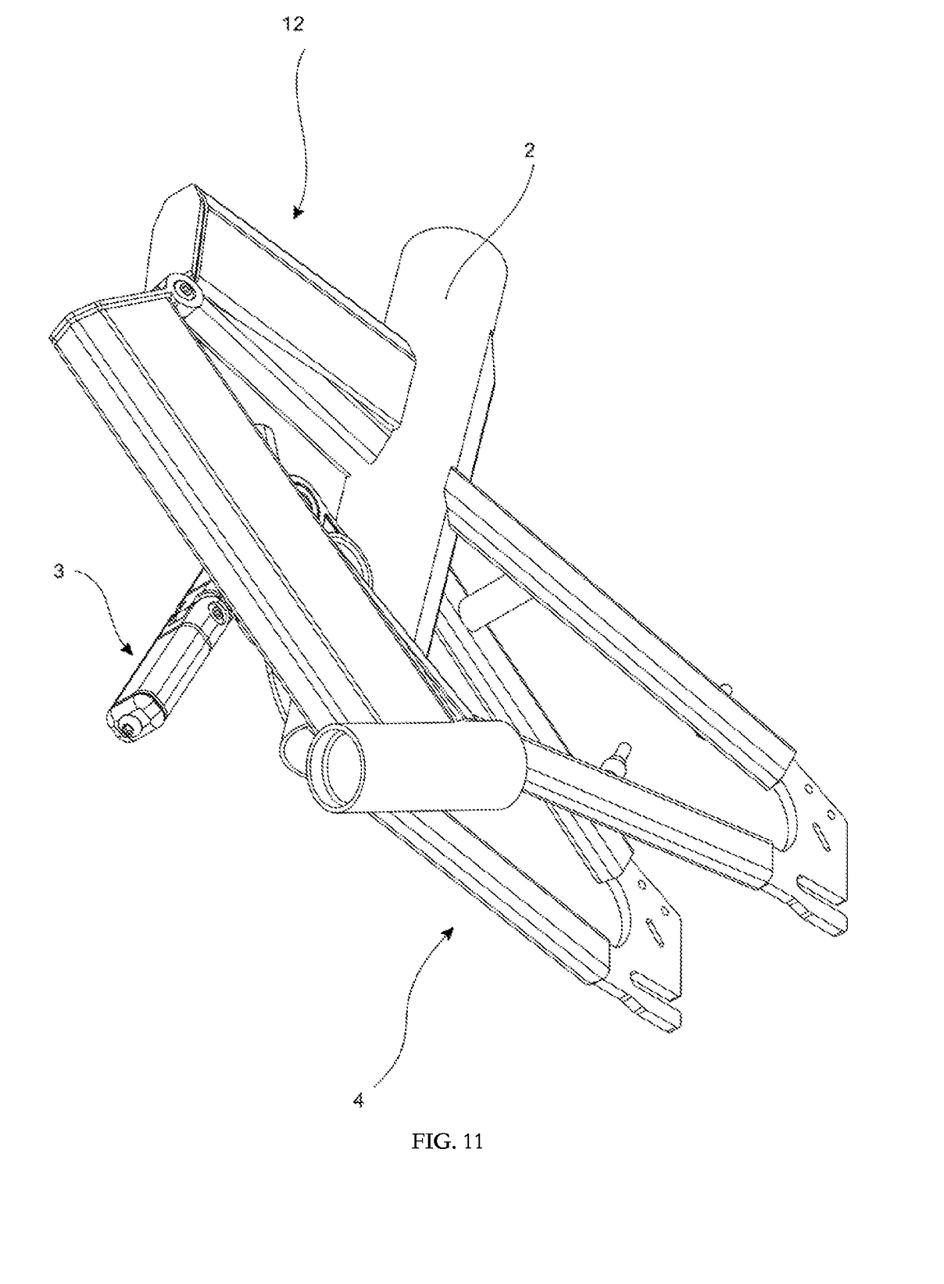
FIG. 11 is a structural schematic diagram of the folding frame of FIG. 8 in the unfolded state from yet another angle.
Figure 12:
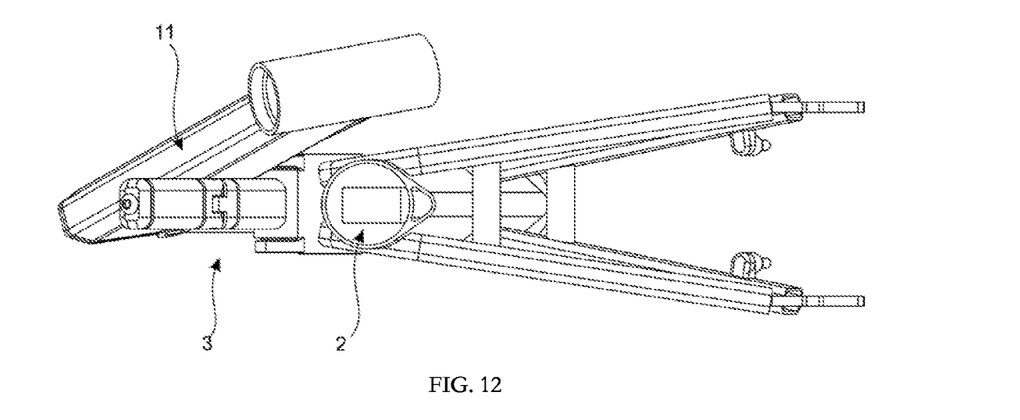
FIG. 12 is a bottom view of the folding frame of FIG. 8 in the folded state.
Figure 13:
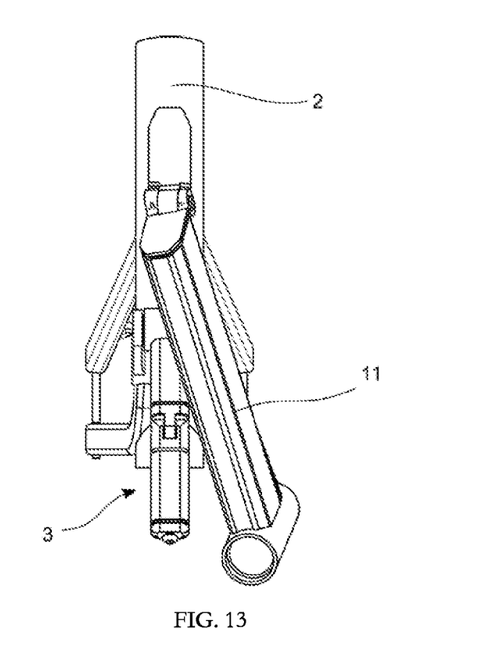
FIG. 13 is a front view of the folding frame of FIG. 8 in the folded state.

As shown in FIG. 8, the front beam 11 and the rear beam 12 are connected through a folding mechanism. The folding mechanism 13 includes two hinges 131. The two hinges 131 are rotationally connected, and one hinge 131 is fixed onto a rear-end face of the front beam 11 and the other hinge 131 is fixed onto a front-end face of the rear beam 12. In the folded state of the folding frame 100, a plane where the hinge is located is perpendicular to the central axis of the rear beam 12. An angle between a rotation shaft 132 between the two hinges 131 and the plane where the hinge 131 is located is an acute angle, and the rotation shaft between the two hinges 131 forms a rotation shaft between the front beam 11 and the rear beam 12.

Since the plane where the hinge 131 is located is perpendicular to the central axis of the rear beam 12, and the angle between the rotation shaft between the two hinges 131 and the plane where the hinge 131 is located is an acute angle, the rotation shaft and the central axis of the rear beam 12 are arranged with an angle (which is an acute angle) therebetween. Relative rotation between the front beam 11 and the cross beam 1 is realized using the folding mechanism 13, without the need of specially processing the structures of the front beam 11 and the rear beam 12. The rear-end face of the front beam 11 can be a flat face, and perpendicular to the central axis of the front beam 11, and the front-end face of the rear beam 12 also can be flat face, and perpendicular to the central axis of the rear beam 12. In installation, it only needs to fix the two hinges 131 respectively on the rear-end face of the front beam 11 and the front-end face of the rear beam 12, facilitating the assembling, connection, processing, and manufacturing.

As shown in FIG. 3 to FIG. 7, in this embodiment, the front column 31 is inserted in a bottom face of the front beam 11, so as to provide a more stable supporting force to the front beam 11. In other embodiments, the front column 31 also can be inserted on a side face of the front beam 11, or other parts of the front beam 11.

More specifically, the front column 31 and the front beam 11 are inserted together through an insertion mechanism. The insertion mechanism includes an insertion column 341 and an insertion groove 342. The insertion column 341 is provided with a frustum-shaped structure 343 on a top end, one end of the frustum-shaped structure 343 with a relatively big diameter is fixedly connected to the insertion column 341. At a place where the frustum-shaped structure 343 is connected to the insertion column 341, the frustum-shaped structure 343 has a bigger diameter than the insertion column 341. The bottom end of the insertion column 341 is fixedly connected to the front end of the front column 31, and the insertion groove 342 is arranged on the front beam 11. Through the cooperation between the insertion column 341 and the insertion groove 342, the insertion between the front column 31 and the front beam 11 can be facilitated. The insertion column 341 can be conveniently inserted in and pulled out through the cooperation between the frustum-shaped structure 343 at the top end and the insertion groove 342. Since the insertion and pull-out are realized through the rotation of the front column 31 and the rear column 32, and the insertion column 341 does not move along the axial direction, by means of a top inclined face formed by the frustum-shaped structure 343, it can facilitate the insertion and pull-out of the frustum-shaped structure 343 at the top end of the insertion column 341.

Figure 7:
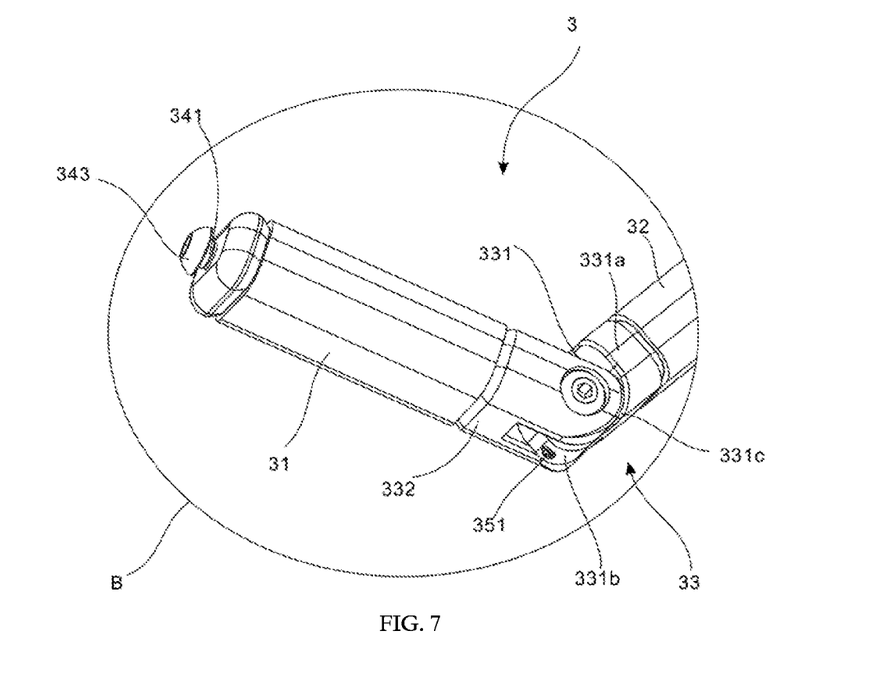
FIG. 7 is an enlarged view of place B in FIG. 6.

In the case where the insertion groove 342 is arranged on the front beam 11, as shown in FIG. 7, the front beam 11 is arranged with a positioning column 14 thereon, the insertion groove 342 is arranged on the positioning column 14. When the folding frame 100 is in the unfolded state, the positioning column 14, the insertion column 341, and the front column 31 are located on the same axis, and by means of the positioning column 14, the insertion groove 342 can be conveniently provided on the front beam 11, and a downward acting force of the cross beam 1 can be applied along an axial direction of the supporting column 3, so that the supporting column 3 can better provide the supporting force, ensuring the stability of the entire frame structure.

In this embodiment, a bottom end of the insertion column 341 is fixedly connected to the front column 31, and the insertion groove 342 is provided on the front beam 11. Herein, in other embodiments, it is also possible that the bottom end of the insertion column 341 is fixedly connected to the front beam 11, and the insertion groove 342 is provided on the front end of the front column 31. In this embodiment, the insertion groove 342 is provided on the positioning column 14. In other embodiments, the insertion groove 342 also can be directly provided on the front beam 11. In the embodiment, the insertion between the front column 31 and the front beam 11 is realized using the insertion column 341 and the frustum-shaped structure 343, herein, in other embodiments, it is also possible that the front end of the front column 31 is directly inserted on the front beam 11, without the provision of the insertion column 341.

In order to ensure the positioning of the front column 31 and the rear column 32 after being unfolded, a positioning mechanism capable of positioning the two on the same axis is provided between the front column 31 and the rear column 32. More specifically, as shown in FIG. 3 to FIG. 7, the front column 31 and the rear column 32 are rotationally connected therebetween through a rotation mechanism 33. The rotation mechanism 33 includes a first rotating element 331 and a second rotating element 332 in rotational connection. The positioning mechanism includes a positioning protrusion 351 and a positioning recess 352 cooperating with each other. The positioning protrusion 351 is provided on the first rotating element 331, the positioning recess is provided on the second rotating element 332. When the folding frame 100 is in an unfolded state, the positioning protrusion 351 is positioned in the positioning recess, and when the folding frame 100 is in the folded state, the positioning protrusion 351 is moved to the outside of the positioning recess. By means of the cooperation between the positioning protrusion 351 and the positioning recess, the front column 31 and the rear column 32, after being located on the same axis, will not rotate relatively without a certain acting force, and only when a user applies an acting force to a place where the front column 31 is connected to the rear column 32, can the two rotate relatively. In the embodiment, the first rotating element 331 is fixed onto the rear column 32; correspondingly, the second rotating element 332 is fixed onto the front column 31. In other embodiments, it is also possible that the first rotating element 331 is fixed onto the front column 31, and correspondingly, the second rotating element 332 is fixed onto the rear column 32.

Furthermore, the second rotating element 332 is in a U shape, and the first rotating element 331 is rotationally connected between two supporting arms of the second rotating elements 332. The positioning recess is provided to a place where two supporting arms of the second rotating elements 332 are connected, and the positioning protrusion 351 is provided on an end face of the first rotating element 331 facing the second rotating element 332. By means of the U-shape second rotating element 332, its connection stability with the first rotating element 331 can be ensured, so that the rotation between the two is relatively stable. The positioning recess is located between the two supporting arms of the second rotating elements 332, so that the positioning recess is located in the interior of the second rotating element 332, to prevent the positioning from being affected by outside interference in the rotating process.

The rotation shaft between the pillar 2 and the rear column 32 is parallel to the rotation shaft between the front column 31 and the rear column 32, and the two are simultaneously perpendicular to the central axis of the rear beam 12 and the central axis of the pillar 2. That is, rotation axial directions at both front and rear ends of the rear column 32 are left-right direction, parallel to rotation axial directions of the front wheel and the rear wheel, so as to make it easy for the user to apply an acting force to the supporting column 3 to bend the supporting column 3. In use, a place where the front column 31 and the rear column 32 of the supporting column 3 are connected can be bent downwards or bent upwards so as to realize the folding or unfolding of the supporting column 3. Herein, in other embodiments, the rotation axial directions of the rear column 32 at both front and rear ends, when being parallel to each other, can be parallel to a vertical face, and the supporting column 3 can be bent towards the left-right direction of the folding vehicle, so as to realize the folding or unfolding of the supporting column 3.

In the embodiment, the rotation mechanism 33 is further provided thereon with a one-way limit structure (also known as one-way stop structure) for enabling the supporting column 3 to be bent unidirectionally, in other words, to be bent one-way. By means of the one-way limit structure, the supporting column 3 is bent towards one direction, and the supporting column 3, when being unfolded, can be effectively positioned in the unfolded state, preventing the supporting column 3, when being unfolded, from being bent again towards another direction which thus causes the operation inconvenient.

Figure 1:
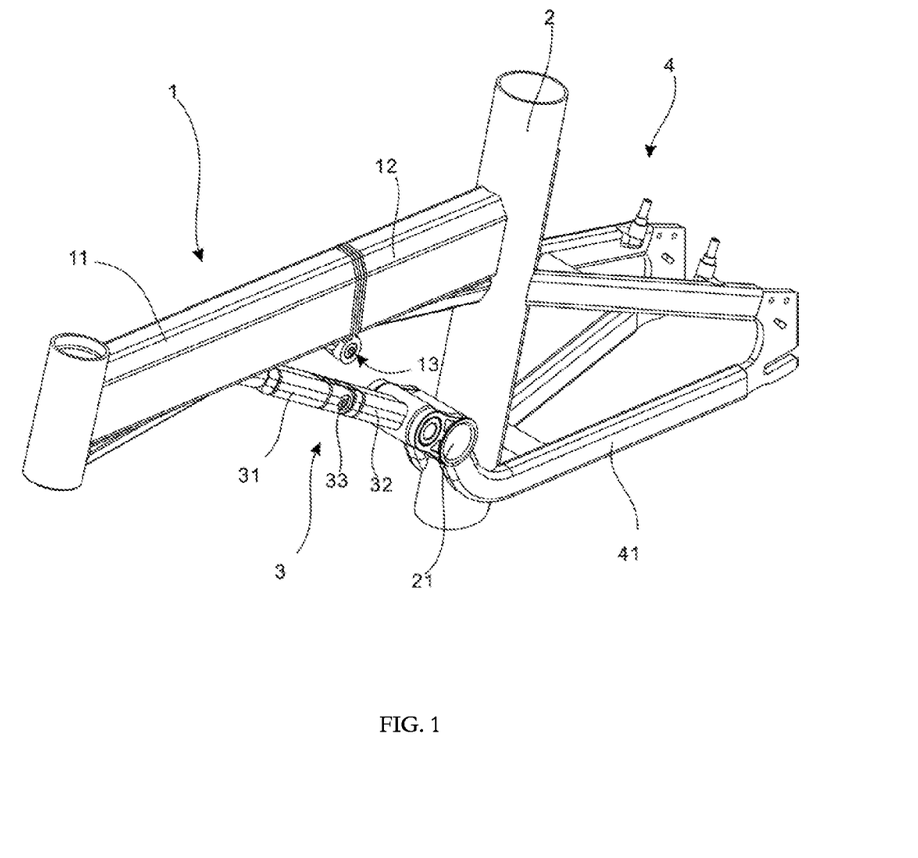
FIG. 1 is a structural schematic diagram of a folding frame provided in an embodiment of the present disclosure in an unfolded state.
Figure 2:
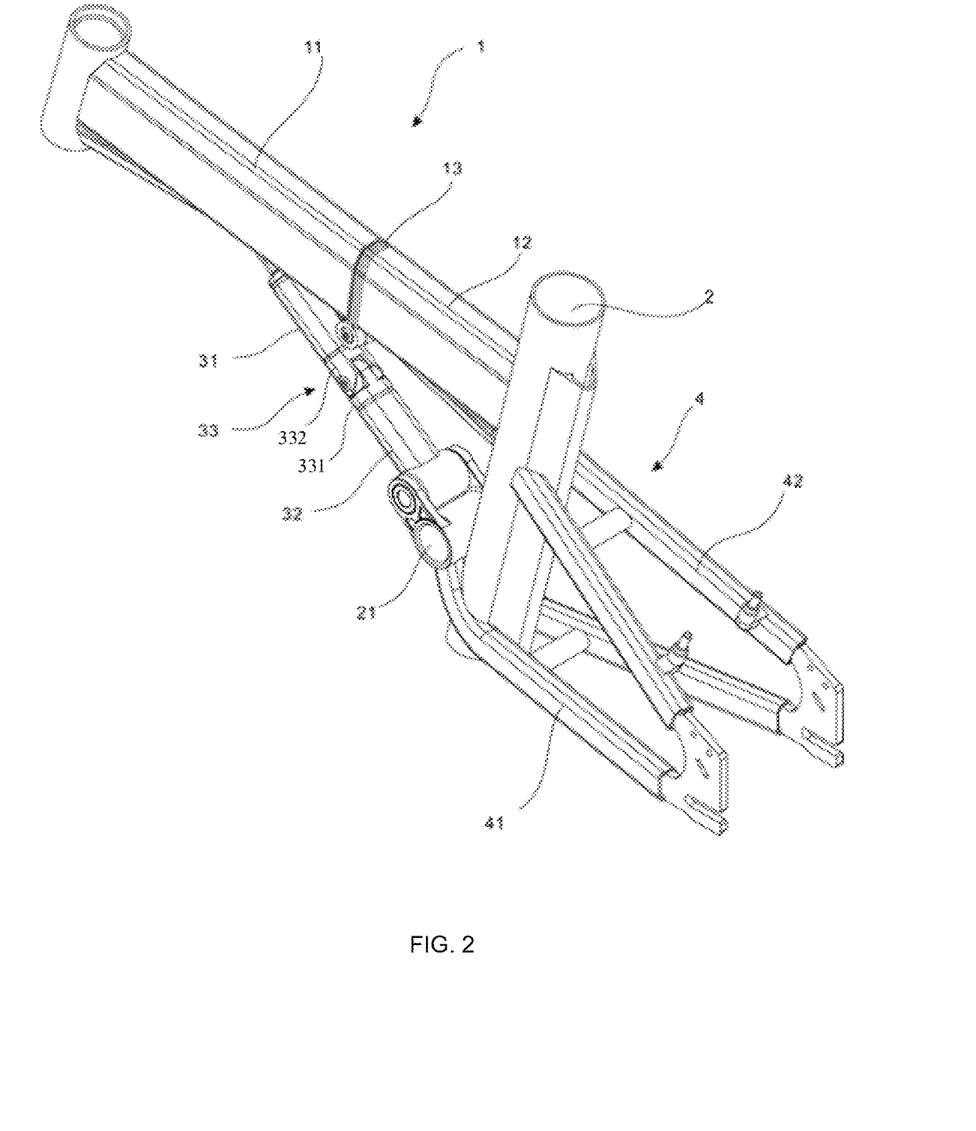
FIG. 2 is a structural schematic diagram of the folding frame of FIG. 1 in the unfolded state from another angle.
Figure 3:
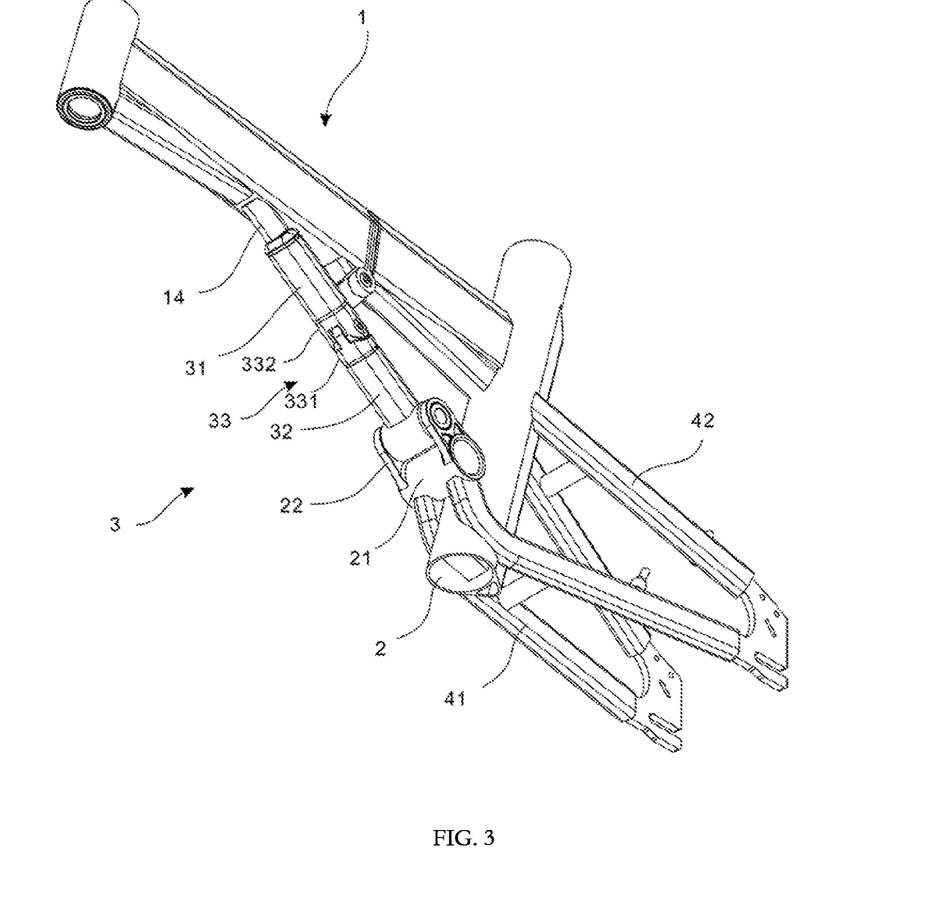
FIG. 3 is a structural schematic diagram of the folding frame of FIG. 1 in the unfolded state from a further angle.
Figure 4:
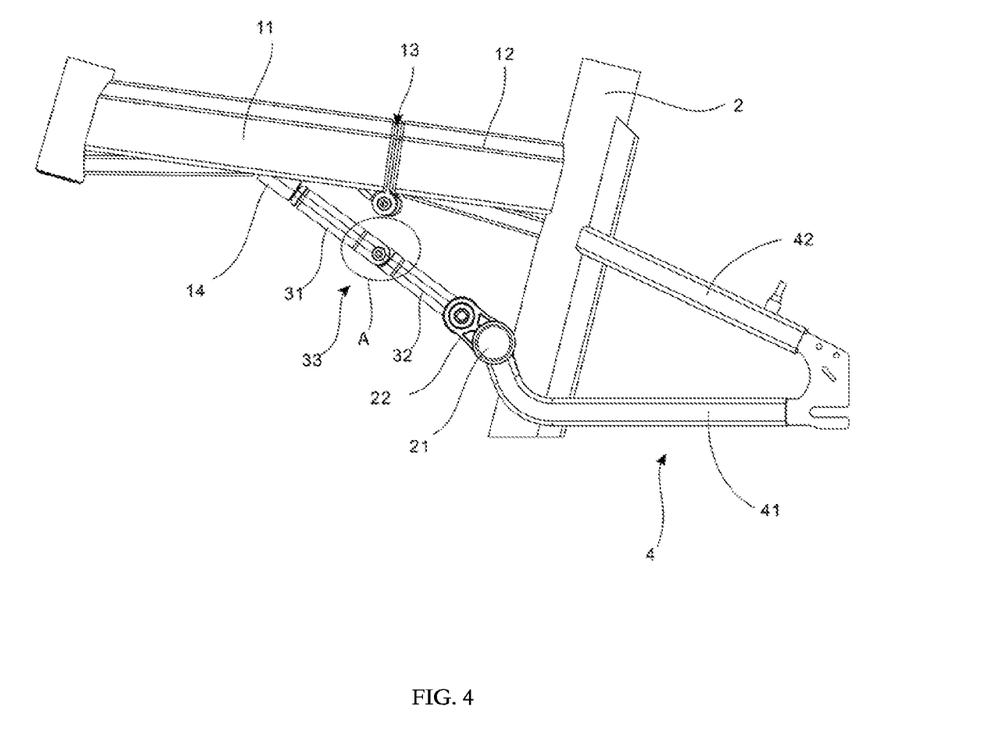
FIG. 4 is a structural schematic diagram of the folding frame of FIG. 1 in the unfolded state from yet another angle.
Figure 5:
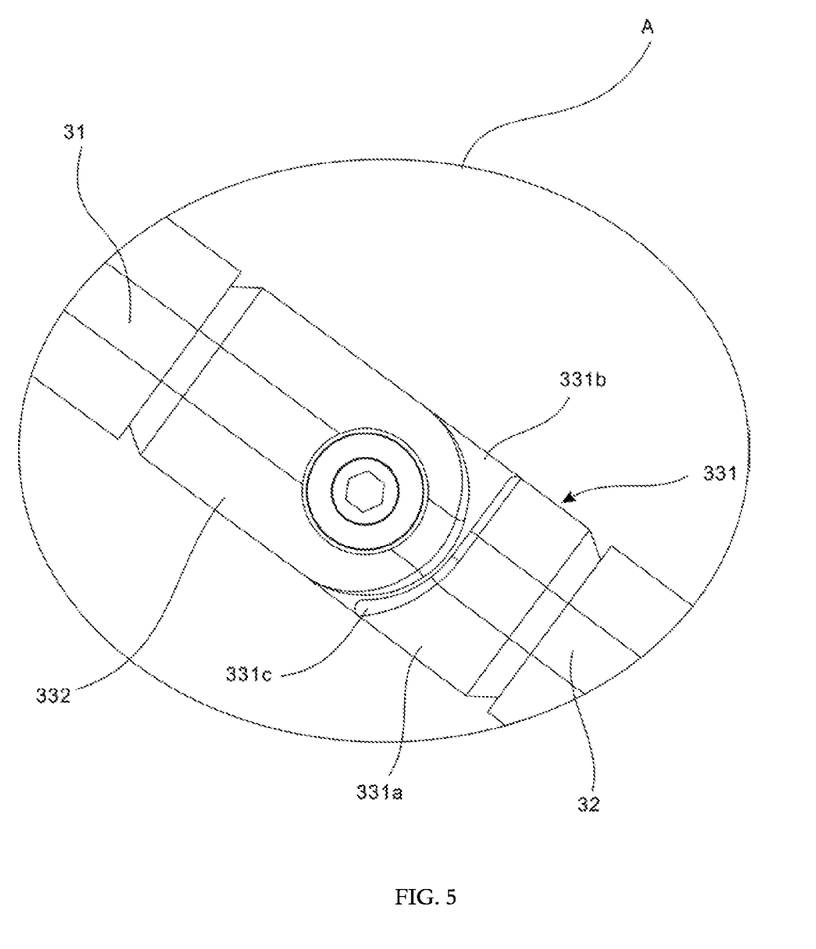
FIG. 5 is an enlarged view of place A in FIG. 4.
Figure 6:
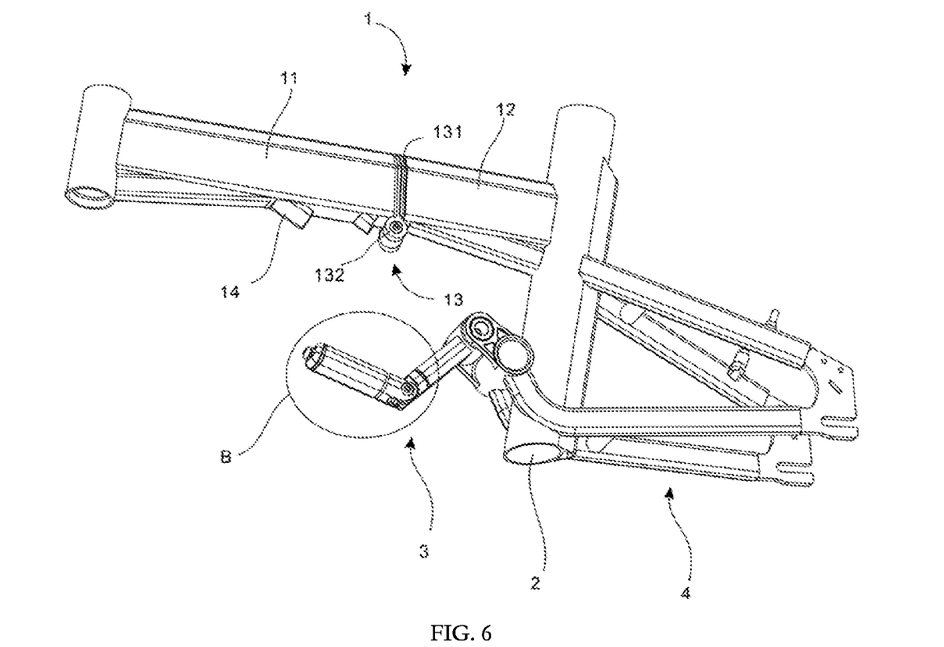
FIG. 6 is a structural schematic diagram of a supporting column, after being bent, of the folding frame provided in the present disclosure.

More specifically, as shown in FIG. 3 to FIG. 5, the first rotating element 331 includes a base 331a and a connecting arm 331b, which connecting arm 331b is fixed in a middle position of the base 331a, so that the first rotating element 331 is substantially in a T shape. The connecting arm 331b is rotationally connected between two supporting arms of the second rotating element 332. The base 331a is fixedly connected to the rear column 32. Herein, when the first rotating element 331 is connected to the front column 31, the base 331a is fixedly connected to the front column 31.

As shown in FIG. 5, a limit protrusion 331c is provided on a surface of the base 33a facing the second rotating element 332 and the limit protrusion 331c is located below the second rotating element 332. After the front column 31 and the rear column 32 are located on the same axis by means of the limit protrusion 331c, the front column 31 cannot rotate downwards relative to the rear column 32, that is, a middle connecting part of the supporting column 3 cannot be further bent upwards, and the limit protrusion 331c forms the one-way limit structure. In the folded state of the supporting column 3, the front column 31 is rotated downwards relative to the rear column 32, that is, the middle connecting part of the supporting column 3 is moved upwards to unfold the supporting column 3, and a top end of the supporting arm of the second rotating element 332, after abutting against the limit protrusion 331c, cannot make the front column 31 further rotate downwards relative to the rear column 32.

When the folding frame 100 is unfolded, the insertion column 341 of the front column is aligned with the insertion groove 342 of the front beam 11, lifts up the middle connecting part of the supporting column 3, then the insertion column 341 can be inserted in the insertion groove 342, at the same time, the supporting column 3 is unfolded to, upon the effects of the limit protrusion 331c and the positioning mechanism, position the front column 31 and the rear column 32 on the same axis, that is, position the supporting column 3 in the unfolded state.

As shown in FIG. 3 and FIG. 4, a connecting element 21 is fixed on the pillar 2, two clamping elements 22 are provided on the connecting element 21, and the rear column 32 is rotationally connected between the two clamping elements 22. The folding frame 100 further includes a rear wheel bracket 4, which rear wheel bracket 4 includes two cross bars 41, and the two cross bars 41 are respectively fixed on two sides of the pillar 2, and are both fixedly connected to the connecting element 21.

Through the connecting element 21, the supporting column 3, the pillar 2, and the cross bars 41 can be conveniently connected together, enhancing the strength of the connecting structure, and ensuring the stability of the entire frame.

The rear wheel can be mounted between the rear ends of the two cross bars 41. The rear wheel bracket 4 further can include two inclined rods 42, rear ends of the two inclined rods 42 are respectively fixedly connected to the rear ends of the two cross bars 41, and front ends of the two inclined rods 42 can be respectively fixedly connected to the upper end of the pillar 2, so as to ensure the stability of the structure of the rear wheel bracket 4.

In the above embodiment, the positioning mechanism includes a positioning protrusion 351 and a positioning recess, and by means of the cooperation between the two, the front column 31 and the rear column 32 are positioned on the same axis. Herein, in other embodiments, the positioning mechanism further can be a fastening handlebar, which is connected to the rotation shaft between the front column 31 and the rear column 32, and when the fastening handlebar is rotated to lock the rotation shaft, the front column 31 and the rear column 32 can no longer rotate relatively, thus positioning the supporting column 3 in the unfolded state. As another embodiment, the positioning mechanism further can be a sleeve, which sleeve is nested outside the front column 31 or the rear column 32, and can relatively slide relative to the front column 31 or the rear column 32, when the front column 31 and the rear column 32 are located on the same axis, the sleeve can be slid to a place where the front column 31 is connected to the rear column 32, and by means of the acting force of the sleeve, the front column 31 and the rear column 32 can no longer rotated relatively. Positioning mechanisms capable of positioning the front column 31 and the rear column 32 on the same axis are of a plurality of types, and they will not be enumerated one by one herein. The structures of the positioning protrusion 351 and the positioning recess in the embodiment are the simplest, easy to process and manufacture, and convenient and quick in operation.

In the above embodiment, the limit protrusion 331c, as a one-way limit structure, is provided on the first rotating element 331, and is simple in structure and easy in processing and manufacture. Herein, in other embodiments, the one-way limit structure also can be of a structure such as limit boss or limit baffle provided on the second rotating element 332, and the limit boss or the limit baffle blocks at one side of the first rotating element 331 so as to define the angle of the first rotating element 331, so that the first rotating element 331 can no longer rotate after rotating by a certain angle.

The above embodiments do not limit the scope of protection of the technical solutions. Any modifications, equivalent substitutions, improvements and so on, made within the spirit and principle of the above embodiments, shall be covered by the scope of protection of the technical solutions.

What is claimed is:

1. A folding frame, comprising a cross beam, a pillar, and a supporting column, wherein the cross beam comprises a front beam and a rear beam; a rear-end bottom of the front beam is rotationally connected to a front-end bottom of the rear beam so that the two are capable of being vertically folded, moreover, an angle between a rotational axis of the front beam and a central axis of the rear beam is an acute angle; the supporting column comprises a front column and a rear column, the front column is inserted in the front beam to cooperate, a rear end of the front column and the front end of the rear column are rotationally connected so that the two are capable of being folded, and the rear column and the pillar are rotationally connected;

when the folding frame is in an unfolded state, the rear end of the front beam abuts against the front end of the rear beam, the front end of the front column is inserted in the front beam, and supports below the front beam, the cross beam, the pillar, and the supporting column define a triangular shape; and when the folding frame is in a folded state, the front column is rotated relative to the rear column to a state in which it is separated from the front beam, and the front beam is rotated relative to the rear beam to the side of the pillar.

2. The folding frame of claim 1, wherein the front beam and the rear beam are connected through a folding mechanism, the folding mechanism comprises two hinges, the two hinges are rotationally connected, and one hinge is fixed onto a rear-end face of the front beam and the other hinge is fixed onto a front-end face of the rear beam, in the folded state of the folding frame, a plane where the hinge is located is perpendicular to the central axis of the rear beam; an angle between a rotation shaft between the two hinges and the plane where the hinge is located is an acute angle, and the rotation shaft between the two hinges forms a rotation shaft between the front beam and the rear beam.

3. The folding frame of claim 1, wherein the front column and the front beam are inserted together through an insertion mechanism, the insertion mechanism comprises an insertion column and an insertion groove, the insertion column is provided with a frustum-shaped structure on a top end, one end of the frustum-shaped structure with a relatively big diameter is fixedly connected to the insertion column, and at a place where the frustum-shaped structure is connected to the insertion column, the frustum-shaped structure has a bigger diameter than the insertion column;

the bottom end of the insertion column is fixedly connected to the front end of the front column, and the insertion groove is arranged on the front beam; or the bottom end of the insertion column is fixedly connected to the front beam, and the insertion groove is arranged on the front end of the front column.

4. The folding frame of claim 3, wherein in a case where the insertion groove is arranged on the front beam, the front beam is arranged with a positioning column thereon, the insertion groove is arranged on the positioning column; when the folding frame is in the unfolded state, the positioning column, the insertion column, and the front column are located on the same axis.

5. The folding frame of claim 1, wherein a positioning mechanism capable of positioning the front column and the rear column on a same axis is provided between the front column and the rear column.

6. The folding frame of claim 5, wherein the front column and the rear column are rotationally connected therebetween through a rotation mechanism, the rotation mechanism comprises a first rotating element and a second rotating element in rotational connection, the positioning mechanism comprises a positioning protrusion and a positioning recess cooperating with each other, the positioning protrusion is provided on the first rotating element, the positioning recess is provided on the second rotating element; when the folding frame is in an unfolded state, the positioning protrusion is positioned in the positioning recess, and when the folding frame is in the folded state, the positioning protrusion is moved to the outside of the positioning recess;

the first rotating element is fixed onto the rear column, correspondingly, the second rotating element is fixed onto the front column; or the first rotating element is fixed onto the front column, and correspondingly, the second rotating element is fixed onto the rear column.

7. The folding frame of claim 6, wherein the second rotating element is in a U shape, and the first rotating element is rotationally connected between two supporting arms of the first rotating elements; the positioning recess is provided a place where two supporting arms of the second rotating elements are connected, and the positioning protrusion is provided on an end face of the first rotating element facing the second rotating element.

8. The folding frame of claim 6, wherein the rotation mechanism is further provided thereon with a one-way limit structure for enabling the supporting column to be bent unidirectionally.

9. The folding frame of claim 8 wherein the first rotating element comprises a base and a connecting arm, which connecting arm is fixed in a middle position of the base, the connecting arm is rotationally connected between two supporting arms of the second rotating element, the base is fixedly connected to the rear column or the front column;
a limit protrusion is provided on a surface of the base facing the second rotating element, and the limit protrusion is located below the second rotating element, the limit protrusion forms the one-way limit structure.

10. The folding frame of claim 1, wherein a rotation shaft between the pillar and the rear column is parallel to a rotation shaft between the front column and the rear column.

11. The folding frame of claim 10, wherein the rotation shaft between the front column and the rear column is simultaneously perpendicular to a central axis of the rear beam and the central axis of the pillar.

12. The folding frame of claim 1, wherein a connecting element is fixed on the pillar, two clamping elements are provided on the connecting element, the rear column is rotationally connected between the two clamping elements; the folding frame further comprises a rear wheel bracket, which rear wheel bracket comprises two cross bars, with one cross bar fixed on one side of the pillar and another bar fixed on another side of the pillar, and the two cross bars are both fixedly connected to the connecting element.

13. A folding vehicle, comprising the folding frame of claim 1.

14. The folding vehicle of claim 13, wherein the front beam and the rear beam are connected through a folding mechanism, the folding mechanism comprises two hinges, the two hinges are rotationally connected, and the two hinges are respectively fixed onto a rear-end face of the front beam and a front-end face of the rear beam, in the folded state of the folding frame, a plane where the hinge is located is perpendicular to the central axis of the rear beam; an angle between a rotation shaft between the two hinges and the plane where the hinge is located is an acute angle, and the rotation shaft between the two hinges forms a rotation shaft between the front beam and the rear beam.

15. The folding vehicle of claim 13, wherein the front column and the front beam are inserted together through an insertion mechanism, the insertion mechanism comprises an insertion column and an insertion groove, the insertion column is provided with a frustum-shaped structure on a top end, one end of the frustum-shaped structure with a relatively big diameter is fixedly connected to the insertion column, and at a place where the frustum-shaped structure is connected to the insertion column, the frustum-shaped structure has a bigger diameter than the insertion column;
the bottom end of the insertion column is fixedly connected to the front end of the front column, and the insertion groove is arranged on the front beam; or
the bottom end of the insertion column is fixedly connected to the front beam, and the insertion groove is arranged on the front end of the front column.

16. The folding vehicle of claim 15, wherein in a case where the insertion groove is arranged on the front beam, the front beam is arranged with a positioning column thereon, the insertion groove is arranged on the positioning column; when the folding frame is in the unfolded state, the positioning column, the insertion column, and the front column are located on the same axis.

17. The folding vehicle of claim 13, wherein a positioning mechanism capable of positioning the front column and the rear column on a same axis is provided between the front column and the rear column.

18. The folding vehicle of claim 17, wherein the front column and the rear column are rotationally connected therebetween through a rotation mechanism, the rotation mechanism comprises a first rotating element and a second rotating element in rotational connection, the positioning mechanism comprises a positioning protrusion and a positioning recess cooperating with each other, the positioning protrusion is provided on the first rotating element, the positioning recess is provided on the second rotating element; when the folding frame is in an unfolded state, the positioning protrusion is positioned in the positioning recess, and when the folding frame is in the folded state, the positioning protrusion is moved to the outside of the positioning recess;
the first rotating element is fixed onto the rear column, correspondingly, the second rotating element is fixed onto the front column; or
the first rotating element is fixed onto the front column, and correspondingly, the second rotating element is fixed onto the rear column.

19. The folding vehicle of claim 18, wherein the second rotating element is in a U shape, and the first rotating element is rotationally connected between two supporting arms of the first rotating elements; the positioning recess is provided a place where two supporting arms of the second rotating elements are connected, and the positioning protrusion is provided on an end face of the first rotating element facing the second rotating element.

20. The folding vehicle of claim 18, wherein the rotation mechanism is further provided thereon with a one-way limit structure for enabling the supporting column to be bent unidirectionally.

* * * * *